(12) United States Patent
Katou et al.

(10) Patent No.: US 8,351,721 B2
(45) Date of Patent: Jan. 8, 2013

(54) IMAGE ENCODING DEVICE

(75) Inventors: Haruhisa Katou, Fujimino (JP); Sei Naitou, Fujimino (JP)

(73) Assignee: KDDI R&D Laboratories, Inc., Saitama (JP)

( * ) Notice: Subject to any disclaimer, the term of this patent is extended or adjusted under 35 U.S.C. 154(b) by 262 days.

(21) Appl. No.: 12/961,974

(22) Filed: Dec. 7, 2010

(65) Prior Publication Data

US 2011/0142358 A1 Jun. 16, 2011

(30) Foreign Application Priority Data

Dec. 11, 2009 (JP) ................................. 2009-281585

(51) Int. Cl.
*G06K 9/36* (2006.01)
*G06K 9/46* (2006.01)
(52) U.S. Cl. ....................... 382/238; 382/232
(58) Field of Classification Search .................. None
See application file for complete search history.

(56) References Cited

U.S. PATENT DOCUMENTS

| | | | | |
|---|---|---|---|---|
| 7,469,069 B2 * | 12/2008 | Kim et al. | ...................... | 382/236 |
| 2007/0154087 A1 * | 7/2007 | Cho et al. | ...................... | 382/166 |
| 2007/0171490 A1 * | 7/2007 | Cho et al. | ...................... | 358/539 |
| 2007/0211797 A1 * | 9/2007 | Kim et al. | ................ | 375/240.12 |
| 2007/0223021 A1 * | 9/2007 | Song | ............... | 358/1.9 |
| 2008/0304759 A1 * | 12/2008 | Lee et al. | ...................... | 382/238 |
| 2009/0028427 A1 * | 1/2009 | Yamada et al. | ................ | 382/166 |
| 2009/0080534 A1 * | 3/2009 | Sekiguchi et al. | ....... | 375/240.25 |

FOREIGN PATENT DOCUMENTS

JP 2005528047 9/2005

OTHER PUBLICATIONS

Goffman-Vinopal, L. "Color image compression using inter-color correlation", International Conference on Image Processing. 2002. pp. II-353-II-356 vol. 2.*

Yong-Hwan Kim, Byeongho Choi, Joonki Paik, "High-Fidelity RGB Video Coding Using Adaptive Inter-Plane Weighted Prediction", Circuits and Systems for Video Technology, IEEE Transactions on, on pp. 1051-1056 vol. 19, Issue: 7, Jul. 2009.*

* cited by examiner

*Primary Examiner* — Li Liu
(74) *Attorney, Agent, or Firm* — Westman, Champlin & Kelly, P.A.

(57) ABSTRACT

The image encoding device includes: signal-to-signal predicting unit 8 for separating an intra-signal prediction residual signal obtained by performing difference processing between an input image signal and an intra-signal prediction signal into a reference signal and a signal to be predicted and calculating signal-to-signal prediction information used for performing signal-to-signal prediction on each pixel of the signal to be predicted corresponding to each pixel of the reference signal; and signal-to-signal compensating unit 9 for obtaining a signal-to-signal prediction signal of the region to be encoded from a decoded intra-signal prediction residual signal and the signal-to-signal prediction information from the signal-to-signal predicting unit, wherein each pixel of the signal to be predicted is encoded by performing orthogonal conversion, quantization, and encoding on the signal-to-signal prediction residual signal obtained by performing the difference processing between the intra-signal prediction residual signal and the signal-to-signal prediction signal.

11 Claims, 2 Drawing Sheets

IMAGE ENCODING DEVICE

The present application is claims priority of Japanese Patent Application Serial No. 2009-281585, filed Dec. 11, 2009, the content of which is hereby incorporated by reference in its entirety.

BACKGROUND OF THE INVENTION

1. Field of the Invention

The present invention relates to image encoding technologies when an image is compressed and encoded, and more particularly, relates to an image encoding device for predicting an object to be encoded from information correlated within the image so as to encode a prediction error to thereby serve to improve encoding efficiency.

2. Description of the Related Art

There has been a method for reducing temporal redundancy and a method for reducing spatial redundancy as a method for improving encoding efficiency in the conventional image encoding.

A frame difference method or a motion compensation method is employed as a method for reducing temporal redundancy. In the frame difference method, a simple subtraction between successive two images is performed, and the obtained difference is encoded.

In the motion compensation method, a motion vector is applied to a reference frame so that an approximate image of a frame to be encoded is generated, and a difference between the approximate image and the frame to be encoded is encoded. Since the motion compensation method reduces a difference between images and encodes the difference, it is more advantageous than the frame difference method in terms of the encoding efficiency.

On the other hand, a method for estimating a motion vector used in the motion compensation method enables reduction of the temporal redundancy; however, this method has a problem that the method cannot be applied to a still image.

There is a method for quantizing an orthogonal conversion coefficient as a method for reducing spatial redundancy employed to improve the encoding efficiency. In this method, the orthogonal conversion maps a pixel signal to a frequency band and concentrates the energy into the lower band. According to this method, indiscriminating of visual characteristics by humans to the high band is used and a high band component is removed by the quantization so that the encoding efficiency can be improved.

Further, when encoding is performed, as explained in Patent Document 1, local decoding is performed on an already-encoded block around a region to be encoded to thereby generate a decoding signal. The decoding signal is used to perform an intra prediction to thereby generate a prediction signal. A predetermined orthogonal conversion and quantization are performed on a residual signal obtained by a difference between a signal component within the block to be encoded and the generated prediction signal to thereby reduce the spatial redundancy. This is generally performed to serve to improve the encoding efficiency.

Patent Document 1: Japanese Patent No. 3734492

The use of a combination of the above-described orthogonal conversion and quantization or the method for reducing spatial redundancy by the spatial prediction method can reduce the spatial redundancy within a frame; however, there is a problem that a different color signal in the same frame is independently processed, and thus, the redundancy of the color signal cannot be reduced.

SUMMARY OF THE INVENTION

The present invention has been proposed in view of the above circumstances, and an object thereof is to provide an image encoding device for improving encoding efficiency by reducing an information amount of a signal to be predicted as a result of adaptively selecting a reference signal that is a reference from among a plurality of color signals obtained by separating an image and predicting another signal (signal to be predicted) from the reference signal.

To achieve the above-described object, in the present invention, at the time of encoding for each unit block by performing orthogonal conversion, quantization, and encoding on an intra-signal prediction residual signal obtained by performing difference processing on each pixel in a unit block configured by a plurality of pixels with each pixel that is intra-signal predicted, the intra-signal prediction residual signal in the unit block is separated into a plurality of signals configured by one reference signal and a signal to be predicted to thereby perform a signal-to-signal prediction, enabling reduction of redundancy of a color signal.

The present invention of the Claim 1 is an image encoding device for encoding for each unit block by performing orthogonal conversion, quantization, and encoding on an input image signal configured by a plurality of unit blocks having a plurality of pixels, comprising:

intra-signal predicting means for calculating intra-signal prediction information used for performing intra-signal prediction on each pixel corresponding to a region to be encoded of an input image signal based on a reconfigured image signal corresponding to an already-encoded region obtained by decoding the orthogonally converted and quantized image signal;

intra-signal compensating means for obtaining an intra-signal prediction signal from the intra-signal prediction information from the intra-signal predicting means and the reconfigured image signal;

signal-to-signal predicting means for separating an intra-signal prediction residual signal obtained by performing difference processing between the input image signal that is the region to be encoded and the intra-signal prediction signal into a reference signal and a signal to be predicted and calculating signal-to-signal prediction information used for performing signal-to-signal prediction on each pixel of the signal to be predicted corresponding to each pixel of the reference signal; and signal-to-signal compensating means for obtaining a signal-to-signal prediction signal of the region to be encoded from a decoded intra-signal prediction residual signal obtained by decoding the orthogonally converted and quantized image signal and the signal-to-signal prediction information from the signal-to-signal predicting means, wherein each pixel of the signal to be predicted is encoded by performing the orthogonal conversion, the quantization, and the encoding on the signal-to-signal prediction residual signal obtained by performing the difference processing between the intra-signal prediction residual signal and the signal-to-signal prediction signal.

The present invention of the Claim 2 is the image encoding device according to claim 1, wherein the reference signal and the signal to be predicted in the signal-to-signal predicting means are separated signals obtained by separating the intra-signal prediction residual signal into a color signal.

The present invention of the Claim 3 is the image encoding device according to claim 1, wherein the signal-to-signal predicting means enables prediction for each unit block when predicting the signal between the reference signal and the signal to be predicted, and enables setting of whether to predict for each pixel signal within the unit block when predicting.

The present invention of the Claim 4 is the image encoding device according to claim 1, wherein when determining a combination of whether to accept selection of the reference signal from the separated signal and adaptation of the signal-to-signal prediction to the signal to be predicted, the signal-to-signal predicting means selects a combination of adapted signals in a manner to minimize an encoding cost calculated from a weighed sum of a generated encoding amount and a distortion amount, and encodes, as the signal-to-signal prediction information, the combination.

The present invention of the Claim 5 is the image encoding device according to claim 1, wherein when determining a combination of whether to accept selection of the reference signal from the separated signal and adaptation of the signal-to-signal prediction to the signal to be predicted, the signal-to-signal predicting means calculates the combination of adapted signals by using distribution of adjacent pixels, amplitude thereof, average thereof, and the intra-signal prediction information.

The present invention of the Claim 6 is the image encoding device according to claim 1, wherein when determining a combination of whether to accept selection of the reference signal from the separated signal and adaptation of the signal-to-signal prediction to the signal to be predicted, the signal-to-signal predicting means previously creates a dictionary through statistical machine learning from the reference signal that minimizes the encoding cost calculated from the weighted sum of the generated encoding amount and the distortion amount, an optimal combination, and the input signal, and estimates the combination relative to the input signal based on the dictionary.

The present invention of the Claim 7 is the image encoding device according to claim 1, wherein the signal-to-signal predicting means does not select, as the reference signal, an invariable signal.

The present invention of the Claim 8 is the image encoding device according to claim 1, wherein the signal-to-signal predicting means does not select, as the signal to be predicted, a variable signal.

The present invention of the Claim 9 is the image encoding device according to claim 1, wherein when the reference signal is selected and signal-to-signal prediction is adapted to the signal to be predicted, the signal-to-signal predicting means performs the signal-to-signal prediction by estimating a prediction coefficient for each region.

The present invention of the Claim 10 is the image encoding device according to claim 9, wherein the prediction coefficient in the signal-to-signal predicting means is configured by a multiplier and a correction value.

The present invention of the Claim 11 is the image encoding device according to claim 9, wherein the prediction coefficient in the signal-to-signal predicting means is estimated so that an error caused between the prediction signal by the reference signal and the signal to be predicted is minimized.

According to an image encoding device as set forth in claim 1, in the image encoding device, a reference signal that is a reference is adaptively selected from among a plurality of signals obtained by separating an image signal, other signals are predicted from the reference signal. In this way, the spatial redundancy is reduced and an information amount of the signal to be predicted is reduced, resulting in serving to improve encoding efficiency.

According to the image encoding device as set forth in claim 2, the signal-to-signal prediction is performed by a separated signal obtained by separating the reference signal and the signal to be predicted into a color signal, thereby enabling a reduction of a color signal redundancy.

According to the image encoding device as set forth in claim 3, prediction is enabled for each unit block and whether to predict can be set for each pixel signal within the unit block, and thus, a signal-to-signal prediction suitable for each pixel can be performed.

According to the image encoding device as set forth in claim 4, regarding the signal-to-signal prediction information that determines a combination of whether to accept selection of the reference signal from the separated signal and adaptation of the signal-to-signal prediction to the signal to be predicted, a combination of the adapted signals is selected in a manner to minimize the encoding cost calculated from an encoding amount and a distortion amount, thereby enabling an appropriate signal prediction.

According to the image encoding device as set forth in claim 5, when determining a combination of whether to accept selection of the reference signal from the separated signal and adaptation of the signal-to-signal prediction to the signal to be predicted, the combination of adapted signals is calculated by using distribution of adjacent pixels, amplitude thereof, average thereof, and the intra-signal prediction information. In this way, processing in which combination information is not encoded can be performed.

According to the image encoding device as set forth in claim 6, when the reference signal relative to the input signal based on a dictionary and a combination are estimated, an appropriate signal prediction can be performed.

According to the image encoding device as set forth in claim 7, when selection in which an invariable signal is not used as the reference signal is performed, an image quality can be improved.

According to the image encoding device as set forth in claim 8, when selection in which a variable signal is not used as the signal to be predicted is performed, an encoding amount reduction can be implemented.

According to the image encoding device as set forth in claim 9, when the reference signal is selected and the signal-to-signal prediction is adapted to the signal to be predicted, if a prediction coefficient is estimated for each region, then the signal-to-signal prediction suitable for each region can be performed.

According to the image encoding device as set forth in claim 10, when the reference signal is selected and the signal-to-signal prediction is adapted to the signal to be predicted, the signal-to-signal prediction can be performed by a prediction coefficient configured by a multiplier and a correction value.

According to the image encoding device as set forth in claim 11, when the prediction coefficient in the signal-to-signal predicting means is estimated so that an error caused between the prediction signal by the reference signal and the signal to be predicted is minimized, signal-to-signal prediction with a good accuracy can be performed.

DETAILED DESCRIPTION OF THE PREFERRED EMBODIMENT

One example of an embodiment of an image encoding device according to the present invention will be explained with reference to FIG. 1 and FIG. 2.

An image encoding device of the present invention is characterized in configuration by the addition of a function of predicting a signal between a plurality of signals by separating the intra-signal prediction residual signal in the unit block into a plurality of signals configured by one reference signal and a signal to be predicted, to the conventionally existing image encoding device in which encoding is performed for each unit block by performing orthogonal conversion, quantization, and encoding on an intra-signal prediction residual signal obtained by performing difference processing on each pixel in a unit block configured by a plurality of pixels with each pixel that is intra-signal predicted from an already-encoded pixel.

Figure 1:
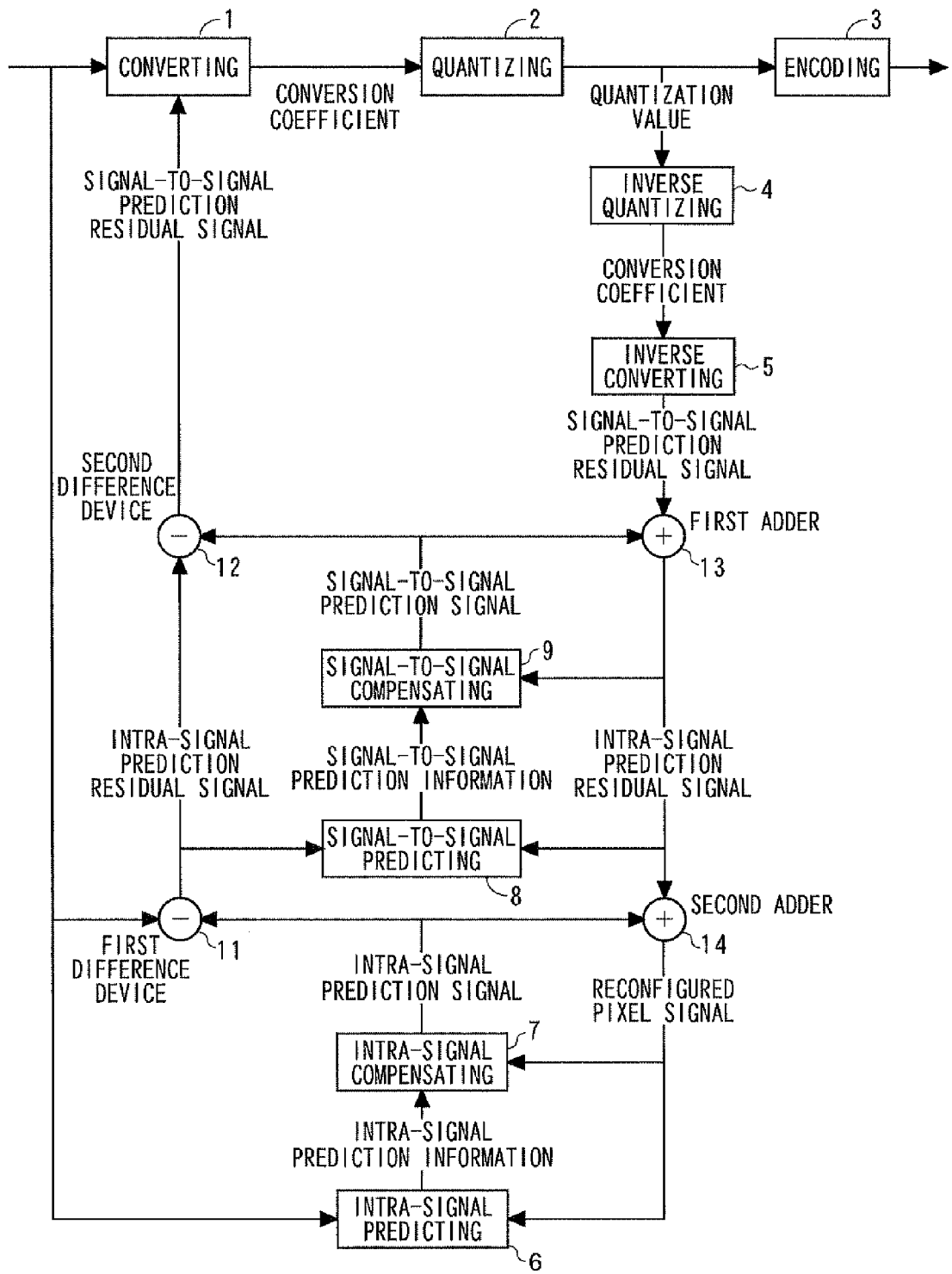
FIG. 1 is a block diagram showing one example of an embodiment of an image encoding device of the present invention.
Figure 2:
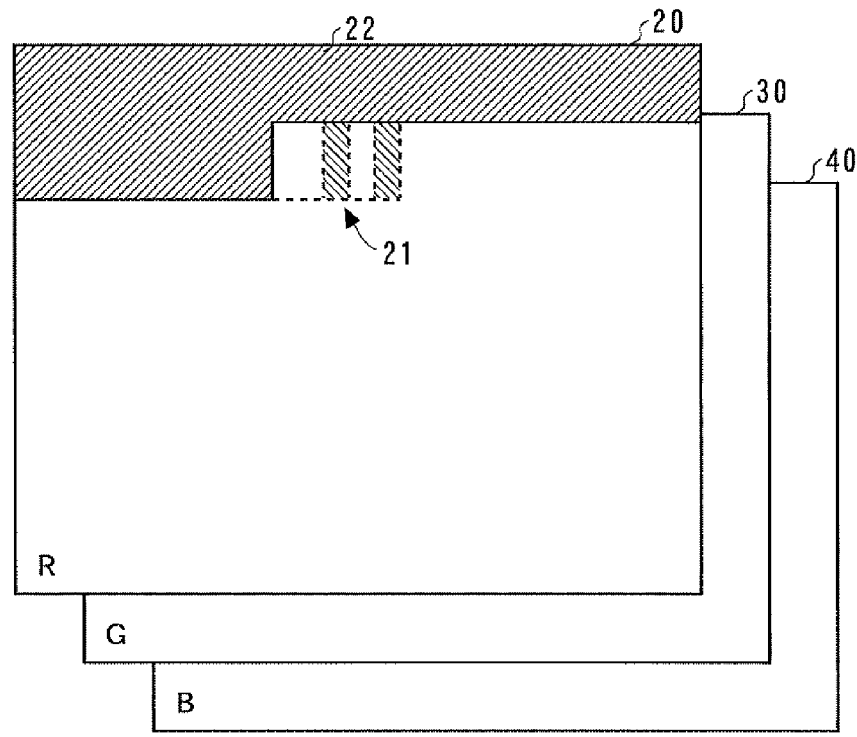
FIG. 2 is an explanatory diagram of an input image input into the image encoding device.

That is, as shown in FIG. 1, the conventional image encoding device includes: converting means 1 for converting into a frequency band by orthogonal conversion; quantizing means 2 for quantizing an orthogonal conversion coefficient; encoding means 3 for variable length encoding the quantized orthogonal conversion coefficient; inverse quantizing means 4 for inversely quantizing the quantized orthogonal conversion coefficient; inverse converting means 5 for inversely converting the inversely quantized orthogonal conversion coefficient; intra-signal predicting means 6 for determining intra-signal prediction information that reduces spatial redundancy; intra-signal compensating means 7 for reconfiguring the intra-signal prediction signal by predicting the spatial redundancy. The image encoding device of the present invention is configured further by signal-to-signal predicting means 8 for predicting a signal between a plurality of signals and signal-to-signal compensating means 9 for obtaining a signal-to-signal prediction signal.

A first difference device 11, which is for reducing the spatial redundancy, calculates a difference, of a pixel in a region to be encoded, between the input image signal and the intra-signal prediction signal predicted from an already-encoded pixel transmitted from the intra-signal compensating means 7. The intra-signal prediction residual signal obtained by the difference processing is transmitted to the signal-to-signal predicting means 8 and a second difference device 12, respectively.

The second difference device 12, which is for reducing the signal-to-signal redundancy, calculates a difference, of the pixel in the region to be encoded, between the intra-signal prediction residual signal transmitted from the first difference device 11 and the signal-to-signal prediction signal predicted from the already-encoded pixel transmitted from the signal-to-signal compensating means 9. The signal-to-signal prediction residual signal obtained by the difference processing is transmitted to the converting means 1.

A first adder 13, which is for compensating the signal-to-signal redundancy, calculates a total of the reproduced (decoded) signal-to-signal prediction residual signal transmitted from the inverse converting means 5 and signal-to-signal prediction signal transmitted from the signal-to-signal compensating means 9 so as to reconfigure (decode) the intra-signal prediction residual signal. The intra-signal prediction residual signal obtained by the addition is transmitted to the signal-to-signal predicting means 8, the signal-to-signal compensating means 9, and a second adder 14, respectively.

The second adder 14, which is for compensating the signal-to-signal redundancy, calculates a total of the intra-signal prediction residual signal transmitted from the first adder 13 and the intra-signal prediction signal transmitted from the intra-signal compensating means 7 so as to reconfigure an image signal (reconfigured image signal) corresponding to the already-encoded pixel. The reconfigured pixel signal obtained by the addition is transmitted to the intra-signal predicting means 6 and the intra-signal compensating means 7, respectively.

The input image and the signal-to-signal prediction error signal transmitted from the second difference device 12 are input to the converting means 1, these are converted to a frequency band by the orthogonal conversion, and a conversion coefficient obtained by the orthogonal conversion is output to the quantizing means 2. DCT, approximate conversion of DCT, and DWT can be used for the orthogonal conversion.

Each picture (frame) of the input image is divided into unit blocks configured by a previously defined number of pixels (for example, 32×32 pixels, 16×16 pixels, 8×8 pixels, 4×4 pixels, or a combination of these), and the encoding is performed for each unit block. Each picture (frame) of the input image is configured by an R signal frame 20, a G signal frame 30, and a B signal frame 40, which are separated into an RGB signal in a color space, for example, as shown in FIG. 2. Each unit block is configured to have a spatially corresponding G signal block and B signal block relative to an R signal block 21.

When the image encoding is performed by the conventional method, only processing is performed for reducing the spatial redundancy based on the intra-signal prediction signal, relative to each frame of the RGB signal. For example, when a profile or a pattern (slashed portion) is present on the image of the R signal block 21, an object to be encoded is predicted from surrounding information correlated within the image, and the prediction error is encoded.

In the present example, the input image each picture of which is divided into the unit blocks is input, the converting means 1 converts a difference value evaluated among the spatially corresponding individual pixels based on the signal of each pixel of each signal block of the RGB or the signal-to-signal prediction residual signal input from the second difference device 12, whereby the processing for reducing the signal-to-signal redundancy is performed.

The quantizing means 2 quantizes the conversion coefficient transmitted from the converting means 1. The quantization value obtained by the quantization is output to the encoding means 3 and the inverse quantizing means 4.

Quantization parameters used for the quantizing processing may be set as a combination of constant values. Further, when the quantization parameter is controlled in accordance with an information amount of the conversion coefficient, an output bit rate can also be kept fixed.

The encoding means 3 encodes the quantized conversion coefficient transmitted from the quantizing means 2 and outputs it as encoding information. Variable length encoding or arithmetic encoding, which removes redundancy between codes, can be used for the encoding.

The inverse quantizing means 4 goes through the inverse steps of the quantizing processing to inversely quantize the quantized conversion coefficient transmitted from the quantizing means 2. The conversion coefficient that contains a quantization error obtained by the inverse quantization is transmitted to the inverse converting means 5.

The inverse converting means 5 goes through the inverse steps of the orthogonal conversion so as to perform inverse orthogonal conversion of the conversion coefficient including the quantization error transmitted from the inverse quantizing means 4. The signal-to-signal prediction residual signal that contains the quantization error obtained by the inverse conversion is transmitted to the first adder 13.

Subsequently, a characteristic configuration of the image encoding device of the present invention regarding the calculation of the signal-to-signal prediction signal input to the second difference device 12 in order to obtain the signal-to-signal prediction residual signal input to the converting means 1 will be explained.

The signal-to-signal prediction signal is calculated by arranging the signal-to-signal predicting means 8 and the signal-to-signal compensating means 9 to which the intra-signal prediction residual signal is input via the first adder 13 in the intra-signal predicting means 6 and the intra-signal compensating means 7. Hereinafter, each function of the intra-signal predicting means 6, the intra-signal compensating means 7, the signal-to-signal predicting means 8, and the signal-to-signal compensating means 9 will be explained.

The intra-signal predicting means 6, which is for determining intra-signal prediction information used for reducing the spatial redundancy, determines the intra-signal prediction information used for approximating the input signal based on the reconfigured pixel signal corresponding to the already-encoded pixel that contains the quantization error transmitted from the second adder 14. The determined intra-signal prediction information is transmitted to the intra-signal compensating means 7 and the encoding means 3. It should be noted that in FIG. 1, although a line to the quantizing means 2 is omitted, one portion of the intra-signal prediction information is quantized and encoded.

To perform an intra-signal prediction, various types of methods have been conventionally performed. For example, as one example, when an intra prediction of the standardized H.264 is employed, encoding is performed individually in each intra prediction mode, an intra prediction mode for minimizing an encoding cost calculated from an encoding amount and a distortion amount (rate distortion optimization method) is selected and used as the intra-signal prediction information. For example, in FIG. 2, when encoding an R signal block (unit block) 21, an image in a shaded portion in the already-encoded same R signal frame 21 (in particular, an immediately above or left-portion image) 22 is used for prediction so as to evaluate the intra-signal prediction information.

The intra-signal compensating means 7, which is for reconfiguring the intra-signal prediction signal by predicting the spatial redundancy, generates the intra-signal prediction signal in the region from the intra-signal prediction information transmitted from the intra-signal predicting means 6 and the reconfigured pixel signal transmitted from the second adder 14. The intra-signal prediction signal is transmitted to the first difference device 11 and the second adder 14.

The signal-to-signal predicting means 8 is for determining the signal-to-signal prediction information used for reducing the signal-to-signal redundancy.

The signal-to-signal predicting means 8 separates the intra-signal prediction residual signal within the unit block into a plurality of signals configured by one reference signal and a signal to be predicted so as to predict a signal among a plurality of signals.

The signal-to-signal predicting means 8 calculates a coefficient for approximating the intra-signal prediction residual signal transmitted from the first difference device 11, based on the intra-signal prediction residual signal that contains the quantization error transmitted from the first adder 13.

The calculated prediction coefficient is transmitted, as the signal-to-signal prediction information, to the signal-to-signal compensating means 9 and the encoding means 3. It should be noted that in FIG. 1, although a line to the quantizing means 2 is omitted, one portion of the signal-to-signal prediction information is quantized and encoded.

Figure 3:
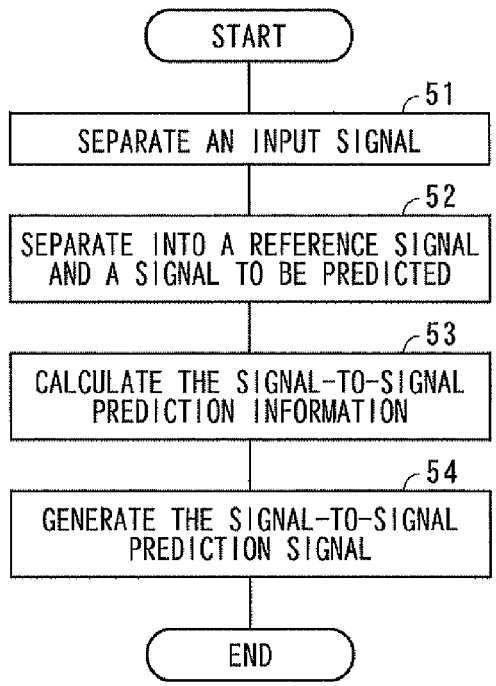
FIG. 3 is a flowchart indicating a procedure for calculating signal-to-signal prediction information and a signal-to-signal prediction signal in signal-to-signal predicting means and signal-to-signal compensating means of the image encoding device.

Hereinafter, the calculation of the prediction coefficient by the signal-to-signal predicting means 8 and a procedure for generating the signal-to-signal prediction signal by the signal-to-signal compensating means 9 will be explained with reference to FIG. 3.

First, in the signal-to-signal predicting means 8, in order to calculate the prediction coefficient, the input signal is separated into a plurality of signals (step 51). Types or the number of the signals to be separated is not limited; however, the unit block is separated into the RGB signal of the color space, as described above as one example. Further, upon separation into a signal of the color space, a signal of a color space, such as a YUV signal and YCbCr signal, may also be employed.

Subsequently, the separated signal is separated into a reference signal that is a reference of the signal-to-signal predicting means 8 and a signal to be predicted (that is to be predicted), and at the same time, whether or not the signal-to-signal prediction information can be adapted to the signal to be predicted is determined (step 52) so as to calculate the signal-to-signal prediction information from the reference signal (step 53). The reference signal and the signal to be predicted may be either singular or plural. A reference signal that is previously determined may be fixedly used, or the reference signal may be changed in a constant range such as a region.

For example, when the signal separation into the RGB signal is performed on the input image, a G signal is used as the reference signal relative to an image with many green colors such as leaves, in which case the smoothness of the signal to be predicted can be exactly reproduced, and thus, a difference between the signal to be predicted and the prediction signal is decreased to thereby serve to improve the encoding efficiency.

That is, when as the image signal, a variable signal is selected as the reference signal, it becomes possible to serve to improve the image quality. Conversely, the variable signal as the image signal occupies a large encoding amount, and thus, when the variable signal is selected as the signal to be predicted, it becomes possible to reduce the encoding amount.

Upon evaluating the signal to be predicted, whether to adapt the signal-to-signal prediction from the reference signal is selected. This selection is determined by a rate distortion optimization method in which the signal-to-signal prediction information, etc., are considered.

Preferably, the calculation of the signal-to-signal prediction information can be predicted for each unit block, and in the case of the prediction, whether to predict for each pixel signal within the unit block can be set.

In the case where the reference signal is changed according to the region, etc., the information representing whether the reference signal is selected and the signal prediction is adapted can be either encoded (clearly specified) or not encoded (implied).

In the case of clearly specifying, all the signals are individually encoded, and a signal that minimizes an encoding cost calculated from the encoding amount and the distortion amount is selected, and information representing the signal is contained in the signal-to-signal prediction information. In the case of limiting the signal to be predicted, the information representing the signal is similarly contained in the signal-to-signal prediction information. For example, the encoding cost is calculated by a weighted sum (R+λD), wherein R denotes the encoding amount and D denotes the distortion amount.

That is, there are 10 different combinations of whether to select the reference signal and adapt the signal-to-signal prediction to each color signal of RGB, as described below:
(1) Use R as the reference signal (reference), adapt the G signal-to-signal prediction (adapt G), and adapt B;
(2) R reference, adapt G, and not adapt the B signal-to-signal prediction (not adapt B);
(3) R reference, not adapt G, and adapt B;
(4) G reference, adapt R, and adapt B;
(5) G reference, adapt R, and not adapt B;
(6) G reference, not adapt R, and adapt B;
(7) B reference, adapt G, and adapt R;
(8) B reference, adapt G, and not adapt R;
(9) B reference, not adapt G, and adapt R; and
(10) Not adapt All of the encoding costs are evaluated, and when a minimum encoding cost is selected, whether to select the reference signal relative to the RGB signal and adapt the signal prediction relative to each of the signals to be predicted can be determined.

In this case (in the case of clearly specifying), two bits of displaying which of the RGB the reference signal is and two bits of displaying whether the signal-to-signal prediction is adapted to the signal to be predicted are expressed relative to the signal-to-signal prediction information, and the variable length encoding is used to perform the encoding.

On the other hand, in the case of implying, the accuracy for the prediction is improved when a variable signal is used as the reference signal, and thus, a signal in which distribution, amplitude, or average of adjacent pixels is maximum is selected and the reference signal is selected by the same means on the decoding side. Thereby, the information representing the signal is not contained in the signal-to-signal prediction information.

Or, the encoding efficiency is improved when the variable signal is used as the signal to be predicted, and thus, the signal in which distribution, amplitude, or average of adjacent pixels, i.e., the reference signal and the signal to be predicted, is maximum is selected and the signal to be predicted is selected by the same means on the decoding side. Thereby, the information representing the signal is not contained in the signal-to-signal prediction information.

Or, if the intra-signal prediction has selected a mode in which a high original image correlation is not lost, then a signal-to-signal redundancy is left in the intra-signal prediction error signal, and thus, whether it is acceptable to adapt the signal-to-signal prediction can be determined based on the intra-signal prediction information.

The signal-to-signal predicting means may also be configured such that when a combination of the reference signal and the signal to be predicted is determined from the separated signal, an optimal combination with the input signal is previously and statistically machine-learned, and the reference signal to the input signal and the combination are estimated from the generated dictionary. For machine learning, an arbitrary discriminator such as known Decision Tree, Random Forest or Neural Network can be used. A feature amount used for the discriminator includes adjacent pixel information of the region to be encoded, the intra-signal prediction information and the input image signal itself. In encoding moving images, in addition to the previous creation of the dictionary, all of the optimal combinations in which the above-described encoding cost (value calculated from the weighted sum of the generated encoding amount and the distortion amount) is minimized for each constant frame or for each cut point are searched, and in this state, sequence learning may be adapted.

Subsequently, a prediction expression for approximating the signal to be predicted from the reference signal and a prediction coefficient, which are used when the reference signal is determined and the signal-to-signal prediction is adapted, will be explained.

As one example, in the case where the signal is separated into the signal of the color space of the YUV signal in which case the Y signal is the reference signal and the U signal and the V signal are signals to be predicted, the predicting means uses a multiplier a and a correction value b of a linear combination as prediction coefficients to thereby estimate in a small region unit. A prediction expression of the U signal and the V signal of a coordinate vector x belonging to a certain small region R can be given by Expression 1.

$$U(\vec{x}) = a_u Y(\vec{x}) + b_u$$

$$\forall \vec{x} \in \mathcal{R}$$

$$V(\vec{x}) = a_v Y(\vec{x}) + b_v \qquad \text{[Expression 1]}$$

In this case, Y(x), U(x), and V(x) represent a pixel value of the YUV signal, respectively. A reference x in the ( ) is a vector. However, in order to prevent the propagation of the error, a quantization error is contained in the reference signal.

The prediction coefficient is estimated so that a square of the prediction error is minimum.

Specifically, one example of a method for calculating prediction coefficients $a_u$ and $b_u$ relative to the U signal will be described. $E^2$, which is a square of the prediction error, is expressed by Expression 2.

$$E^2 = \sum_{\vec{x} \in \mathcal{R}} \{a_u Y(\vec{x}) + b_u - U(\vec{x})\}^2 \qquad \text{[Expression 2]}$$

At this time, a partial differential of the square error $E_u^2$ based on the coefficients a and b is represented by Expression 3.

$$\frac{\partial E^2}{\partial a} = 2a \sum_{\vec{x} \in \mathcal{R}} Y(\vec{x}) - 2 \sum_{\vec{x} \in \mathcal{R}} Y(\vec{x}) U(\vec{x}) + 2b \sum_{\vec{x} \in \mathcal{R}} Y(\vec{x}) \qquad \text{[Expression 3]}$$

$$\frac{\partial E^2}{\partial b} = 2nb - 2 \sum_{\vec{x} \in \mathcal{R}} U(\vec{x}) + 2a \sum_{\vec{x} \in \mathcal{R}} Y(\vec{x})$$

In this case, n represents the number of pixels belonging to the small region R.

It is necessary that Expression 3 becomes zero in order to minimize the square error $E^2$. Therefore, the prediction coefficients $a_u$ and $b_u$ can be calculated when Expression 4 is solved.

$$\begin{pmatrix} \sum_{\vec{x}\in R} Y(\vec{x})^2 & \sum_{\vec{x}\in R} Y(\vec{x}) \\ \sum_{\vec{x}\in R} Y(\vec{x}) & n \end{pmatrix} \begin{pmatrix} a_u \\ b_u \end{pmatrix} = \begin{pmatrix} \sum_{\vec{x}\in R} Y(\vec{x})U(\vec{x}) \\ \sum_{\vec{x}\in R} U(\vec{x}) \end{pmatrix} \quad \text{[Expression 4]}$$

When Expression 4 is solved, the multiplier $a_u$ and the correction value $b_u$ that minimize the square error $E^2$ can be evaluated by Expression 5.

$$a_u = \frac{n\sum_{\vec{x}\in R} Y(\vec{x})U(\vec{x}) - \sum_{\vec{x}\in R} Y(\vec{x}) \sum_{\vec{x}\in R} U(\vec{x})}{n\sum_{\vec{x}\in R} \{Y(\vec{x})\}^2 - \left\{\sum_{\vec{x}\in R} Y(\vec{x})\right\}^2} \quad \text{[Expression 5]}$$

$$b_u = \frac{1}{n}\left(\sum_{\vec{x}\in R} U(\vec{x}) - a_u \sum_{\vec{x}\in R} Y(\vec{x})\right)$$

It is noted that the correction value $b_u$ can be deduced by using the multiplier $a_u$, and thus, when the multiplier $a_u$ is quantized for encoding, the correction value is calculated by the multiplier that contains the quantization error to thereby enable the improvement of the prediction accuracy.

In the above-described calculation, the prediction coefficients $a_u$ and $b_u$ relative to the U signal are evaluated; prediction coefficients $a_v$ and $b_v$ relative to the V signal can also be evaluated by simply replacing U (vector x) in Expression 5 by V (vector x).

The signal-to-signal compensating means 9, which is for reconfiguring the signal-to-signal prediction signal by predicting the signal-to-signal redundancy, obtains the signal-to-signal prediction signal from the signal-to-signal prediction information from the signal-to-signal predicting means 8 and the intra-signal prediction residual signal from the first adder 13 (step 54). That is, the signal-to-signal compensating means 9 generates the signal-to-signal prediction signal that approximates the signal to be predicted from the signal-to-signal prediction information transmitted from the signal-to-signal predicting means 8 and the signal-to-signal prediction residual signal transmitted from the first adder 13. The generated signal-to-signal prediction signal is output to the first adder 13 and the second difference device 12.

In the above example, when the signal-to-signal predicting means 8 employs the linear combination and the signal-to-signal prediction information is configured by the multiplier a and the correction value b, the prediction signal is generated by the above-described Expression 1.

According to the image encoding device configured as above, upon converting the pixel in the region to be encoded of each unit block by using the converting means 1, regarding the signals (the RGB signal, the YUV signal, the YCbCr signal, etc.) separated by the color space, the difference value of each of the spatially corresponding pixels is converted based on the signal-to-signal prediction error signal input from the second difference device 12, and the encoding is performed by the quantizing means 2 and the encoding means 3.

The signal-to-signal prediction error signal input to the converting means 1 is calculated by the intra-signal prediction and the signal-to-signal prediction from the reproduced pixel signal of the already-encoded image region and the reproduced intra-signal prediction error signal.

That is, upon encoding each pixel signal in the region to be encoded of the unit block, regarding the already-encoded pixel signal around the pixel to be encoded, the inverse quantizing means 4 and the inverse converting means 5 are intervened. In this way, the signal-to-signal prediction residual signal is reproduced, and the first adder 13 and the second adder 14 are intervened. Thereby, the intra-signal prediction residual signal is reproduced. These reproduced signals are output to the intra-signal predicting means 6 and the intra-signal compensating means 7. At the same time, the intra-signal prediction residual signal is reproduced via the first adder 13 and the reproduced signal is output to the signal-to-signal predicting means 8 and the signal-to-signal compensating means 9.

The input image is input to the intra-signal predicting means 6, and the intra-signal prediction signal is generated by the intra-signal prediction information in the intra-signal compensating means 7 and output to the first difference device 11.

In the first difference device 11, the intra-signal prediction residual signal is generated from a difference between the input image and the intra-signal prediction signal, and output to the signal-to-signal predicting means 8 and the second difference device 12.

In the signal-to-signal predicting means 8, the signal-to-signal prediction information is calculated by the intra-signal prediction residual signal from the first difference device 11 and the intra-signal prediction residual signal from the first adder 13 to generate the signal-to-signal prediction signal, and the generated signal is output to the second difference device 12.

In the second difference device 12, the signal-to-signal prediction residual signal is generated by a difference between the intra-signal prediction residual signal from the first difference device 11 and the signal-to-signal prediction signal, and the signal-to-signal prediction residual signal is input to the converting means 1 to thereby perform the intra prediction from the pixel signal in the already-encoded image region, and at the same time, the signal to be predicted is generated by predicting another signal from the reference signal in the color space. In this way, the spatial redundancy is reduced to thereby reduce the information amount of the signal to be predicted, resulting in the improvement of the encoding efficiency.

According to the above-described image encoding device, the signal prediction is adopted in which the input signal is separated into a plurality of signals, another signal is predicted from a signal that is a reference to thereby reduce an amount of information to be generated in the signal to be predicted. Thereby, high encoding efficiency is enabled. Further, the image encoding device can combine the conventional prediction method for reducing the temporal redundancy, etc. This serves to further improve the encoding efficiency.

What is claimed is:

1. An image encoding device for encoding for each unit block by performing orthogonal conversion, quantization, and encoding on an input image signal configured by a plurality of unit blocks having a plurality of pixels, comprising:
   intra-signal predicting means for calculating intra-signal prediction information used for performing intra-signal prediction on each pixel corresponding to a region to be encoded of an input image signal based on a reconfigured image signal corresponding to an already-encoded region obtained by decoding the orthogonally converted and quantized image signal;

intra-signal compensating means for obtaining an intra-signal prediction signal from the intra-signal prediction information from the intra-signal predicting means and the reconfigured image signal;

signal-to-signal predicting means for separating an intra-signal prediction residual signal obtained by performing difference processing between the input image signal that is the region to be encoded and the intra-signal prediction signal into a reference signal and a signal to be predicted and calculating signal-to-signal prediction information used for performing signal-to-signal prediction on each pixel of the signal to be predicted corresponding to each pixel of the reference signal; and signal-to-signal compensating means for obtaining a signal-to-signal prediction signal of the region to be encoded from a decoded intra-signal prediction residual signal obtained by decoding the orthogonally converted and quantized image signal and the signal-to-signal prediction information from the signal-to-signal predicting means, wherein each pixel of the signal to be predicted is encoded by performing the orthogonal conversion, the quantization, and the encoding on the signal-to-signal prediction residual signal obtained by performing the difference processing between the intra-signal prediction residual signal and the signal-to-signal prediction signal.

2. The image encoding device according to claim 1, wherein the reference signal and the signal to be predicted in the signal-to-signal predicting means are separated signals obtained by separating the intra-signal prediction residual signal into a color signal.

3. The image encoding device according to claim 1, wherein the signal-to-signal predicting means enables prediction for each unit block when predicting the signal between the reference signal and the signal to be predicted, and enables setting of whether to predict for each pixel signal within the unit block when predicting.

4. The image encoding device according to claim 1, wherein when determining a combination of whether to accept selection of the reference signal from the separated signal and adaptation of the signal-to-signal prediction to the signal to be predicted, the signal-to-signal predicting means selects a combination of adapted signals in a manner to minimize an encoding cost calculated from a weighed sum of a generated encoding amount and a distortion amount, and encodes, as the signal-to-signal prediction information, the combination.

5. The image encoding device according to claim 1, wherein when determining a combination of whether to accept selection of the reference signal from the separated signal and adaptation of the signal-to-signal prediction to the signal to be predicted, the signal-to-signal predicting means calculates the combination of adapted signals by using distribution of adjacent pixels, amplitude thereof, average thereof, and the intra-signal prediction information.

6. The image encoding device according to claim 1, wherein when determining a combination of whether to accept selection of the reference signal from the separated signal and adaptation of the signal-to-signal prediction to the signal to be predicted, the signal-to-signal predicting means previously creates a dictionary through statistical machine learning from the reference signal that minimizes the encoding cost calculated from the weighted sum of the generated encoding amount and the distortion amount, an optimal combination, and the input signal, and estimates the combination relative to the input signal based on the dictionary.

7. The image encoding device according to claim 1, wherein the signal-to-signal predicting means does not select, as the reference signal, an invariable signal.

8. The image encoding device according to claim 1, wherein the signal-to-signal predicting means does not select, as the signal to be predicted, a variable signal.

9. The image encoding device according to claim 1, wherein when the reference signal is selected and signal-to-signal prediction is adapted to the signal to be predicted, the signal-to-signal predicting means performs the signal-to-signal prediction by estimating a prediction coefficient for each region.

10. The image encoding device according to claim 9, wherein the prediction coefficient in the signal-to-signal predicting means is configured by a multiplier and a correction value.

11. The image encoding device according to claim 9, wherein the prediction coefficient in the signal-to-signal predicting means is estimated so that an error caused between the prediction signal by the reference signal and the signal to be predicted is minimized.

* * * * *